US008857477B2

United States Patent
Lolli et al.

(10) Patent No.: US 8,857,477 B2
(45) Date of Patent: Oct. 14, 2014

(54) KIT FOR REPAIRING AND INFLATING INFLATABLE ARTICLES

(75) Inventors: Sergio Lolli, Pesaro (IT); Maurizio Marini, Pesaro (IT)

(73) Assignee: Tek Global S.r.l., Pesaro (IT)

( * ) Notice: Subject to any disclaimer, the term of this patent is extended or adjusted under 35 U.S.C. 154(b) by 961 days.

(21) Appl. No.: 12/305,476

(22) PCT Filed: Jun. 19, 2007

(86) PCT No.: PCT/IB2007/001670
§ 371 (c)(1),
(2), (4) Date: Apr. 10, 2009

(87) PCT Pub. No.: WO2008/001179
PCT Pub. Date: Jan. 3, 2008

(65) Prior Publication Data
US 2009/0266440 A1 Oct. 29, 2009

(30) Foreign Application Priority Data

Jun. 20, 2006 (IT) .............................. TO2006A0454

(51) Int. Cl.
*B65B 31/00* (2006.01)
*B29C 73/16* (2006.01)
*B60S 5/04* (2006.01)
*B29L 30/00* (2006.01)

(52) U.S. Cl.
CPC .............. *B60S 5/043* (2013.01); *B29L 2030/00* (2013.01); *B29C 73/166* (2013.01)

USPC ............................................... 141/38; 141/67

(58) Field of Classification Search
CPC .............. B65B 3/26; F16J 15/46; B60C 5/16; B60C 25/145
USPC .................... 141/38, 65, 67, 39, 100
See application file for complete search history.

(56) References Cited

U.S. PATENT DOCUMENTS

| 4,765,367 | A | * | 8/1988 | Scott ............................. 137/607 |
| 6,964,284 | B2 | | 11/2005 | Eckhardt |
| 7,798,183 | B2 | * | 9/2010 | Cegelski et al. ................. 141/38 |
| 7,878,360 | B2 | * | 2/2011 | Takeda ..................... 220/203.13 |
| 2003/0047652 | A1 | | 3/2003 | Eckhardt |

FOREIGN PATENT DOCUMENTS

| DE | 10 2004 060 662 A | 6/2006 |
| EP | 1 439 053 A | 7/2004 |
| WO | WO 2005/085028 A | 9/2005 |

* cited by examiner

*Primary Examiner* — Davis Hwu
(74) *Attorney, Agent, or Firm* — Ladas & Parry LLP

(57) ABSTRACT

A kit for repairing and inflating inflatable articles has a compressor assembly; a sealing fluid container assembly defining an inlet connectable to the compressor assembly, and an outlet connecting the container assembly fluidically to an inflatable article; a casing at least partly housing the compressor assembly; a supporting member fixed with respect to the casing; and click-on connecting means for connecting the container assembly to the supporting member. More specifically, the click-on connecting means define a conduit for fluidically connecting the container assembly and compressor assembly.

25 Claims, 3 Drawing Sheets

KIT FOR REPAIRING AND INFLATING INFLATABLE ARTICLES

This application is a 371 of PCT/IB2007/001670 filed on Jun. 19, 2006, published on Jan. 3, 2008 under publication number WO 2008/001179 A and claims priority benefits of Italian Patent Application No. TO2006A000454 filed Jun. 20, 2006, the disclosure of which is incorporated herein by reference.

TECHNICAL FIELD

The present invention relates to a kit for repairing and inflating inflatable articles, e.g. a vehicle tyre.

BACKGROUND ART

Tyre repair and inflation kits are known comprising a casing; a compressor housed inside the casing; a supporting portion fixed with respect to the casing; and a container of sealing fluid connected stably to the compressor and the supporting portion.

Known containers comprise a sealing fluid bottle; and a fluidic device screwed to the bottle and defining an inlet connected by a tube to the compressor, and an outlet connectable to the tyre to inject the sealing fluid and inflate the tyre.

More specifically, the container is clicked onto the supporting portion, and is connected fluidically to the compressor by a tube and a lever-operated connection.

After the kit is used, the empty container must be replaced with a full one. To do which, the user must disconnect the lever-operated connection, remove the empty container, fit on the new container, and connect the lever-operated connection to the new container.

DISCLOSURE OF INVENTION

It is an object of the present invention to provide a tyre repair and inflation kit, in which the container of sealing fluid is easier and faster to change.

According to the present invention, there is provided a kit for repairing and inflating inflatable articles, as claimed in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
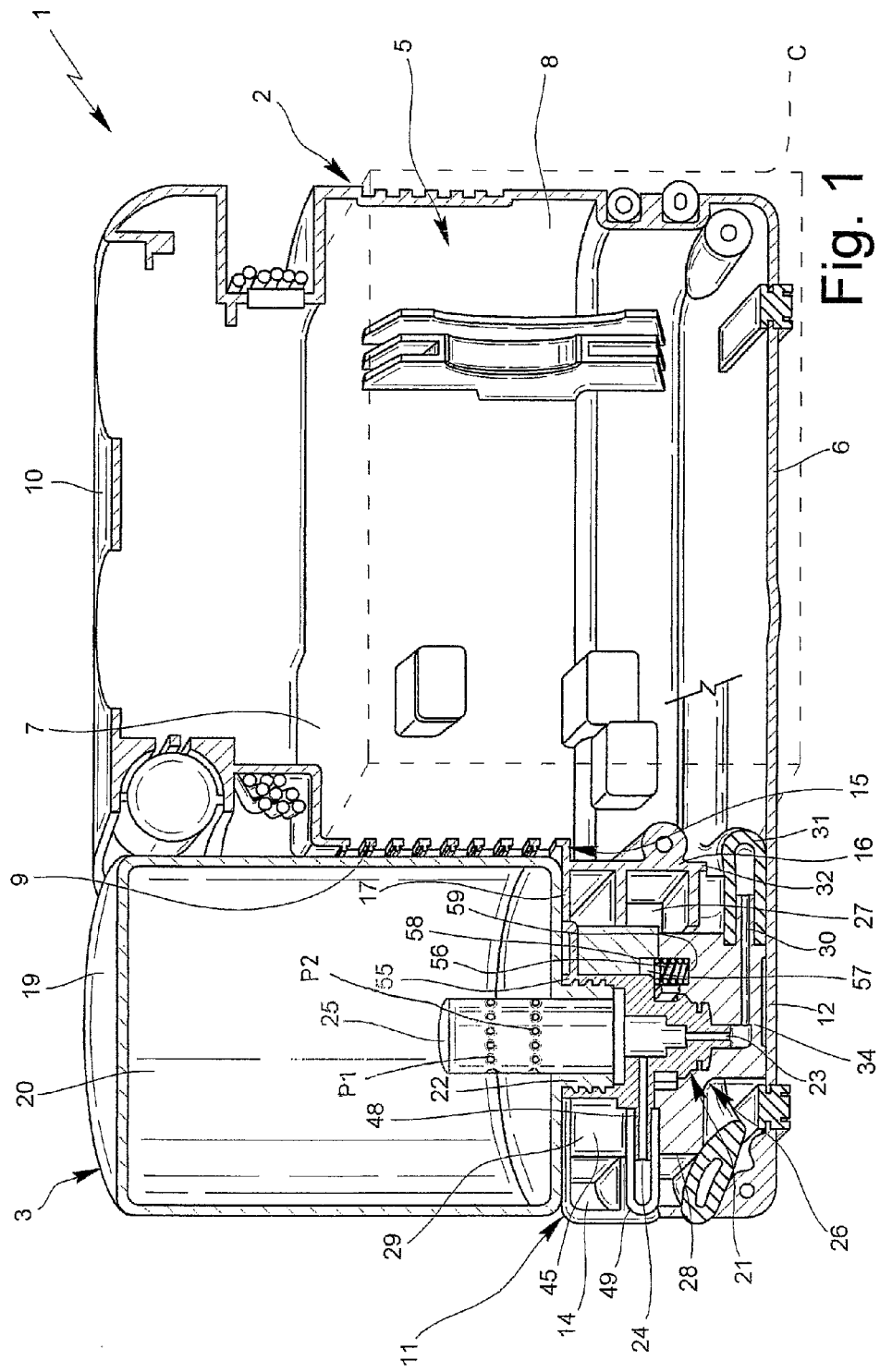
FIG. 1 shows a longitudinal section, with parts removed for clarity, of a kit in accordance with the present invention.

Number 1 in FIG. 1 indicates a kit for repairing and inflating inflatable articles, in particular tyres. Kit 1 comprises a casing 2; a compressor assembly C (shown schematically); and a container assembly 3 connected removably to casing 2 and containing a known sealing fluid.

More specifically, casing 2 is substantially parallelepiped-shaped, defines a chamber 5 housing compressor assembly C, and comprises a bottom wall 6; substantially flat side walls 7 (only one shown in FIG. 1); a convex rear wall 8 connecting side walls 7; a concave wall 9 facing rear wall 8; and a top wall 10 substantially parallel to bottom wall 6.

More specifically, concave wall 9 is smaller in height than rear wall 8, and defines a quadrangular opening 15 together with bottom wall 6 and respective bottom edges of side walls 7.

Kit 1 also comprises a box member 11 connected rigidly to casing 2 at quadrangular opening 15, and defining a housing 27 for a click-on connecting device 26, which cooperates with container assembly 3 as described in detail below.

Box member 11 is preferably integral with casing 2, and comprises a bottom wall 12 and side walls 13, which are respective extensions of bottom wall 6 and side walls 7; a convex front wall 14; a transverse wall 16 interposed between front wall 14 and rear wall 8 to close quadrangular opening 15; and a top wall 17 substantially parallel to bottom wall 12 and defining a shaped opening (not shown).

Transverse wall 16 connects bottom wall 12 to top wall 17 at concave wall 9, and bounds chamber 5 with respect to housing 27.

Container assembly 3 of kit 1 comprises a bottle 19 defining a chamber 20 containing the sealing fluid; and a fluidic unit 21 screwed to a threaded neck 22 of bottle 19.

More specifically, fluidic unit 21 defines an inlet 23 connectable to compressor assembly C; and an outlet 24 connectable, in use, to a tyre for repair.

Container assembly 3 also comprises a valve 25 interposed between inlet 23 and outlet 24, and defining a first and second number of holes P1 and P2 normally closed by a slide not shown. Container assembly 3 preferably comprises a non-return valve (not shown) in series with valve 25 to prevent backflow of the sealing fluid inside a conduit 34.

Click-on device 26 connects container assembly 3 fluidically and mechanically to casing 2 by means of box member 11.

Figure 3:
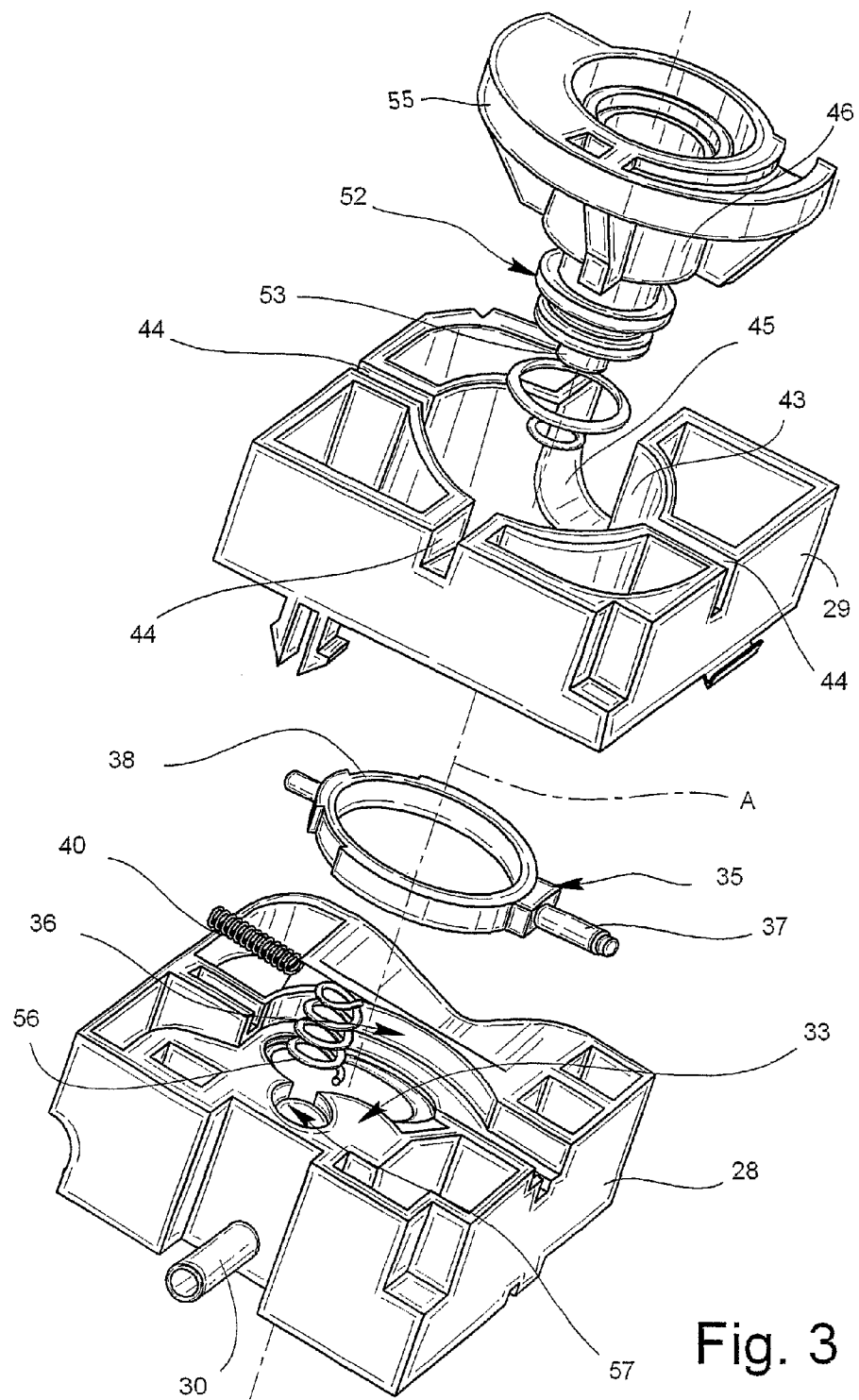
FIG. 3 shows an exploded view in perspective of parts of the FIG. 1 kit.

Connecting device 26 (FIG. 3) comprises a base 28 connected rigidly to bottom wall 12; and a guide member 29 superimposed on base 28 and supporting, in use, container assembly 3.

Base 28 is substantially parallelepiped-shaped, and comprises, integrally, a tubular projection 30 connected to compressor assembly C by a tube 31 extending through an opening 32 in transverse wall 16.

Base 28 defines a cylindrical seat 33 open on the opposite side to bottom wall 12, and having an axis A perpendicular to bottom wall 12, and a conduit 34 extending through tubular projection 30 to connect seat 33 fluidically to tube 31.

Click-on connecting device 26 also comprises a stop member 35, which slides in a direction perpendicular to axis A and is housed in a housing 36 defined by base 28.

More specifically, stop member 35 comprises a rod 37; and a ring 38 connected rigidly to one end of rod 37, and which, on the diametrically opposite side to rod 37, cooperates with a spring 40 to maintain a predetermined position.

Housing 36 is bounded, in the direction of axis A, by base 28 and guide member 29, and is interposed between seat 33 and guide member 29.

Figure 2:
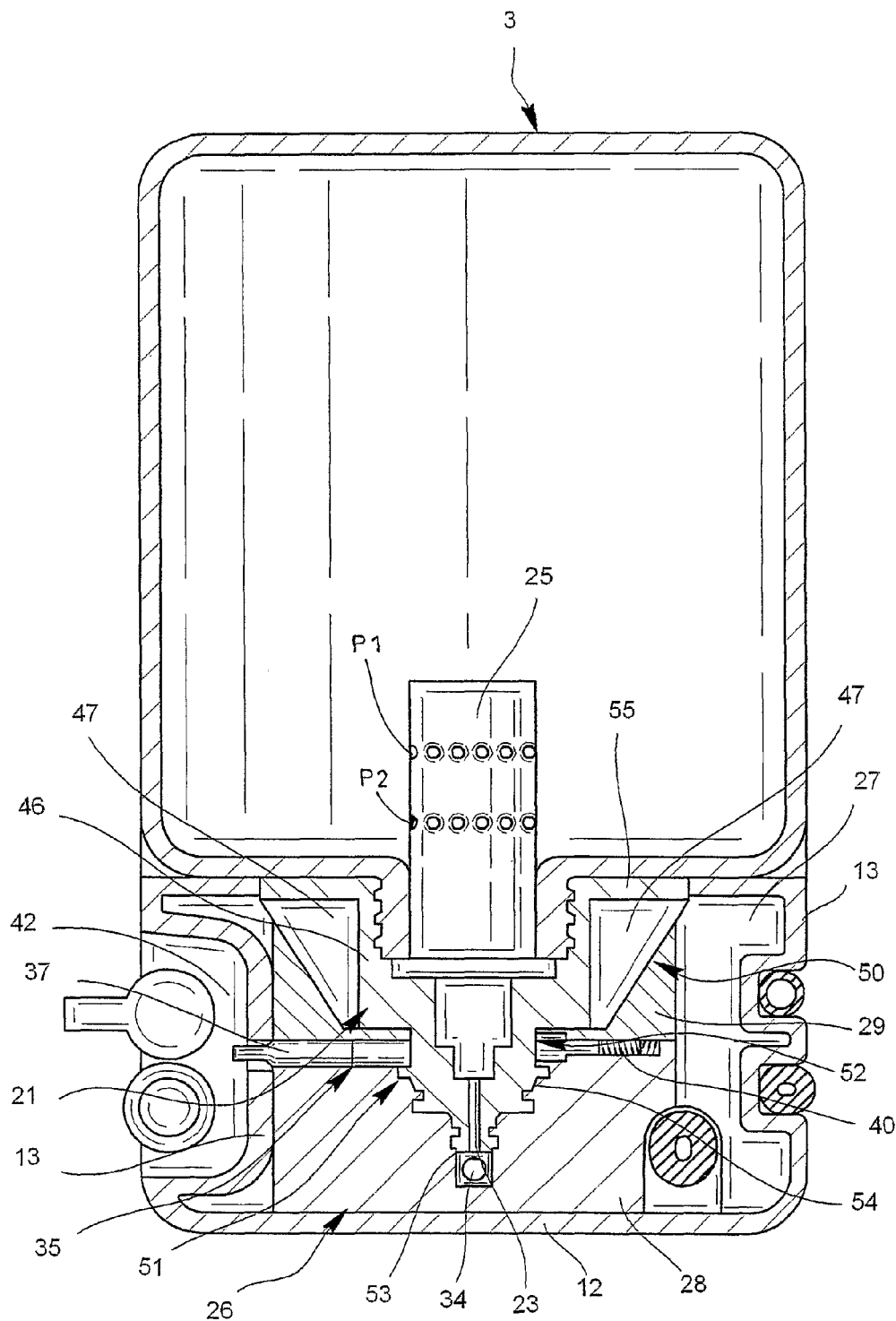
FIG. 2 shows a section along line II-II in FIG. 1.

When stop member 35 is fitted inside housing 36, rod 37 projects laterally from base 28, and is user-accessible by means of an opening 42 in box member 11 defined by one of the two side walls 13 (FIG. 2).

Guide member 29 is click-on connected rigidly to base 28 to define a substantially parallelepiped-shaped block.

Guide member 29 defines a hole 43 coaxial with axis A and communicating with seat 33, and with three slits 44 and a groove 45, which are parallel to axis A and equally spaced 90° apart about hole 43.

Slits 44 mate with fluidic unit 21 to guide the sliding movement of container assembly 3 along a fixed axis parallel to axis A.

For which purpose, fluidic unit 21 comprises, integrally, a cylindrical body 46 screwed to bottle 19; three ribs 47 projecting radially from cylindrical body 46 to engage slits 44; and a tubular projection 48 defining outlet 24 and housed in groove 45. Tubular projection 48 is connected to a hose 49 connectable, when required, to a damaged tyre to inject sealing fluid fed from container assembly 3 by compressed air produced by compressor assembly C. More specifically, groove 45 is a radially through groove, and front wall 14 has a corresponding groove to permit insertion of hose 49.

Each rib 47 preferably defines a sloping edge 50 converging towards axis A, and relative slit 44 also slopes accordingly at the bottom.

On the opposite side to bottle 19, fluidic unit 21 comprises a fastening portion 51 integral and coaxial with cylindrical body 46. Fastening portion 51 defines an annular groove 52 close to cylindrical body 46; a sealing portion 53 away from cylindrical body 46; and a sealing portion 54 interposed between sealing portion 53 and annular groove 52.

Sealing portions 53, 54 are fitted with respective O-rings to define a fluidtight connection when container assembly 3 is connected to base 28.

Fluidic unit 21 comprises a semicircular flange 55 projecting from cylindrical body 46, and which covers ribs 47 but leaves tubular projection 48 exposed.

Semicircular flange 55 and tubular projection 48 thus define a shaped profile, which, viewed from above, is approximately equal to but no larger than the shaped opening in top wall 17 of box member 11.

Kit 1 also comprises an elastic member 56, preferably a coil spring, resting on base 28 and cooperating with container assembly 3 and in particular with fluidic unit 21.

Elastic member 56 is preferably housed in a cylindrical seat 57 communicating with hole 43 and defined between base 28 and guide member 29. Seat 57 is conveniently bounded axially by a bottom surface 59 defined by base 28, and by a shoulder 58 defined by guide member 29, and communicates with hole 43 so that, when elastic member 56 is released, a portion of elastic member 56 projects inside hole 43 to cooperate with fluidic unit 21.

Kit 1 operates as follows.

When ready to use, container assembly 3 is connected in fixed manner to compressor assembly C by base 28, box member 11, and casing 2; and inlet 23 is connected fluidically to compressor assembly C by conduit 34 and tube 31.

When necessary, compressor assembly C is activated, and, following pressurization of inlet 23, valve 25 allows compressed air into chamber 20 through holes P1, and outflow of the sealing fluid through holes P2 and outlet 24. The sealing fluid is then fed by the compressed air along hose 49 and into the tyre to seal the puncture.

More specifically, sealing portions 53, 54 are housed in conduit 34 and seat 33 respectively, and leakage prevented by the sealing rings; and container assembly 3 is connected to base 28 by ring 38 of stop member 35, which is held by spring 40 in a position engaging annular groove 52.

More specifically, when stop member 35 engages annular groove 52, cylindrical body 46 compresses elastic member 56.

When the sealing fluid is used up or past its used-by date, container assembly 3 must be replaced with a new one.

To do this, the user presses rod 37 of stop member 35 in opposition to spring 40 to release ring 38 from annular groove 52. Elastic member 56 is designed to overcome both friction between fluidic unit 21, base 28, and guide member 29, and the weight of container assembly 3 and hose 49.

Therefore, when ring 38 is released from annular groove 52, elastic member 56 extracts fluidic unit 21 partly from guide member 29.

When container assembly 3 is removed, elastic member 56 rests against shoulder 58 and remains inside seat 57.

When the new container assembly 3 is inserted, ribs 47 engage slits 44 in a foolproof angular position; and slits 44 and ribs 47 define a sliding guide to guide container assembly 3 in a straight, fixed fastening direction parallel to axis A.

More specifically, the sliding guide defined by slits 44 and ribs 47 defines a constraint preventing rotation and movement in a plane perpendicular to axis A.

The position of ribs 47 is preferably referred to axis A of seat 33, so that sealing portions 53, 54 are centred with and engage conduit 34 and seat 33 respectively. At the same time, tubular projection 48 and hose 49 are inserted inside groove 45 and the groove defined by front wall 14 and facing groove 45.

As fluidic unit 21 is inserted inside guide member 29, cylindrical body 46 compresses elastic member 56.

Semicircular flange 55 coming to rest axially on guide member 29 defines a fixed axial fastening position, in which ring 38 is engaged automatically inside annular groove 52 by spring 40, and container assembly 3 is connected rigidly to box member 11.

Kit 1 as described and illustrated herein has the following advantages.

Click-on device 26, which provides for both mechanical and fluidic connection to compressor assembly C, makes container assembly 3 easier and faster to change.

Elastic member 56 simplifies extraction of container assembly 3, and takes up any axial slack when kit 1 is in the ready-to-use condition.

The sliding guide defined by guide member 29 with fluidic unit 21 provides for centring sealing portions 53, 54 with respect to conduit 34, and so preventing damage to the O-rings by the edges of base 28.

Container assembly 3 is safeguarded against withdrawal by stop member 35, and against any other form of stress by guide member 29, so that, even in the event of occasional shock, stop member 35 is subjected to very little stress and may be compact in design.

The fact that stop member 35 is movable crosswise to axis A also increases compactness axially, in that ring 38 is therefore subjected to substantially pure shear stress, thus resulting in very little internal stress.

Assembly is simplified by slide in only being possible when fluidic unit 21 is in the right foolproof angular position defined by slits 44, and in which tubular projection 48 can be inserted inside groove 45.

Shoulder 58 prevents withdrawal from seat 57 and loss of elastic member 56 when the container assembly is detached from guide member 29.

Clearly, changes may be made to kit 1 as described and illustrated herein without, however, departing from the scope of the present invention as defined in the accompanying Claims.

For example, the axial fastening position of container assembly 3 to base 28 may be defined by ribs 47 resting on the sloping bottom of respective slits 44.

In a further embodiment, kit 1 comprises a system for expelling container assembly 3, and which comprises a first and second coil spring housed in respective cylindrical seats defined by base 28 and closed at the top by guide member 29. Each seat houses a sliding insert loaded by the relative spring against guide member 29. Each insert is connected rigidly to a rod movable parallel to axis A together with the relative insert. And the rods are of such a length as to project with respect to guide member 29 when container assembly 3 is detached from device 26, and are compressed by container assembly 3 when this is inserted inside device 26.

The invention claimed is:

1. A kit for repairing and inflating inflatable articles, comprising a compressor assembly;
a detachable sealing fluid container assembly, said container assembly comprising a fluidic body defining an inlet connectable to said compressor assembly and an outlet connected to a hose such that said container assembly may be fluidically connected to an inflatable article;
a casing at least partly housing said compressor assembly;
a supporting member fixed with respect to said casing; and
click-on connecting means for connecting said container assembly to said supporting member;
wherein said click-on connecting means define a seat fixed with respect to said supporting member to support said container assembly; and
a conduit fixed with respect to said supporting member and connected fluidically to said seat to connect said container assembly and said compressor assembly, said conduit being arranged in series to said container assembly upstream of said inlet and within the seat of the connecting means, whereby the inlet and outlet are separable from the conduit when the container assembly is disconnected from the compressor.

2. A kit as claimed in claim 1, comprising sliding guide means fixed with respect to said supporting member and cooperating with said container assembly to determine a fixed angular position of said container assembly, and to guide said container assembly in a straight fastening direction to said click-on connecting means.

3. A kit as claimed in claim 2, wherein said sliding guide means are designed to define a constraint preventing rotation and movement, crosswise to said fastening direction, of said container assembly with respect to said supporting member.

4. A kit as claimed in claim 3, wherein said sliding guide means comprise a guide member fixed with respect to said supporting member and defining at least one cavity; and in that said container assembly defines at least one wall which slides inside said at least one cavity.

5. A kit as claimed in claim 4, wherein said click-on connecting means comprise a base connected rigidly to said supporting member; and wherein in that said guide member is supported by said base.

6. A kit as claimed in claim 5, wherein said container assembly comprises a vessel defining a chamber for sealing fluid; and a fluidic body connected to said vessel and defining said inlet; said fluidic body integrally comprising said at least one wall.

7. A kit as claimed in claim 1, comprising elastic means cooperating with said container assembly and preloaded to remove said container assembly when said click-on connecting means are released.

8. A kit as claimed in claim 7, wherein said click-on connecting means comprise a stop member cooperating with said container assembly and movable manually between a lock position, in which said container assembly is fixed with respect to said supporting member, and a release position, in which said container assembly is removable from said supporting member.

9. A kit as claimed in claim 8, wherein said stop member slides in a direction crosswise to said fastening direction.

10. A kit as claimed in claim 5, wherein said stop member slides in a seat defined between said base and said guide member.

11. A kit as claimed in claim 7, wherein said elastic means are housed in a second seat; and by comprising constraint means cooperating with said elastic means to retain said elastic means in said second seat.

12. A kit as claimed in claim 11, wherein said elastic means comprise a coil spring; and in that said constraint means define a supporting surface and a shoulder, which define said second seat longitudinally.

13. A kit as claimed in claim 1, wherein said supporting member is integral with said casing.

14. A kit as claimed in claim 1, wherein an O-ring is located between the sealing fluid container and the supporting member to provide a seal therebetween.

15. A kit as claimed in claim 1, wherein an O-ring is located around said inlet and there is no O-ring around said outlet.

16. A kit as claimed in claim 1, wherein said outlet is connected to a hose.

17. A kit as claimed in claim 1, wherein said click-on connecting means further comprises a guide member provided with a central opening within which said inlet and outlet are positioned when the container assembly is connected to said compressor assembly, said guide member having a groove in a wall thereof providing access to said central opening.

18. A kit for repairing and inflating inflatable articles, comprising a compressor assembly;
a detachable sealing fluid container assembly, said container assembly comprising a fluidic body defining an inlet connectable to said compressor assembly and an outlet;
a casing at least partly housing said compressor assembly;
a supporting member fixed with respect to said casing; and
click-on connecting means for connecting said container assembly to said supporting member;
wherein said click-on connecting means define a seat fixed with respect to said supporting member to support said container assembly; and
a conduit fixed with respect to said supporting member and connected fluidically to said seat to connect said container assembly and said compressor assembly, said conduit being arranged in series to said container upstream of said inlet and within the seat of the connecting means, whereby the inlet and outlet are separable from the conduit when the container assembly is disconnected from the compressor and wherein said click-on connecting means further comprises a guide member provided with a central opening within which said inlet and outlet are positioned when the container assembly is connected to said compressor assembly, said guide member having a groove in a wall thereof providing access to said central opening.

19. A kit as claimed in claim 1 wherein said fluidic body further comprises a fastening portion for mounting a sealing fluid container which portion comprises a sealing portion dimensioned to provide a tight seal with said seat.

20. A kit for repairing and inflating inflatable articles, comprising a compressor assembly;
a detachable sealing fluid container assembly, said container assembly comprising a fluidic body defining an inlet connectable to said compressor assembly and an outlet;
a casing at least partly housing said compressor assembly;
a supporting member fixed with respect to said casing; and click-on connecting means for connecting said container assembly to said supporting member;

wherein said click-on connecting means define a seat fixed with respect to said supporting member to support said container assembly; and a conduit fixed with respect to said supporting member and connected fluidically to said seat to connect said container assembly and said compressor assembly, said conduit being arranged in series to said container assembly upstream of said inlet and within the seat of the connecting means, whereby the inlet and outlet are separable from the conduit when the container is disconnected from the compressor, wherein said fluidic body further comprises a fastening portion for mounting a sealing fluid container which portion comprises a sealing portion dimensioned to provide a tight seal with said seat.

21. A kit as claimed in claim 19 wherein said sealing portion cooperates with a slidable stop member positioned in an annular groove located in said seat.

22. A kit as claimed in claim 20 wherein said sealing portion cooperates with a slidable stop member positioned in an annular groove located in said seat.

23. A kit as claimed in claim 1, wherein the kit comprises sealing means for creating a seal at portions of interface between the fluidic body and the supporting member when the fluidic body is connected to the supporting member, and wherein the click-on connecting means comprises a guide member superimposed on the base, the guide member comprising means for centering the fluidic body with respect to the conduit so as to inhibit damage to the sealing means.

24. A kit as claimed in claim 23, wherein the compressor assembly is housed in a first portion of the casing, and wherein the casing comprises means for defining a separate compartment housing the guide member comprising the means for centering.

25. A kit as claimed in claim 1, wherein the click-on connecting means comprises guide means for guiding the container assembly to the supporting member along an axis that is perpendicular to a bottom wall of the supporting member.

* * * * *